C. H. LIKELY.
SPRING WHEEL.
APPLICATION FILED OCT. 27, 1915.
1,166,697.
Patented Jan. 4, 1916.
2 SHEETS—SHEET 2.
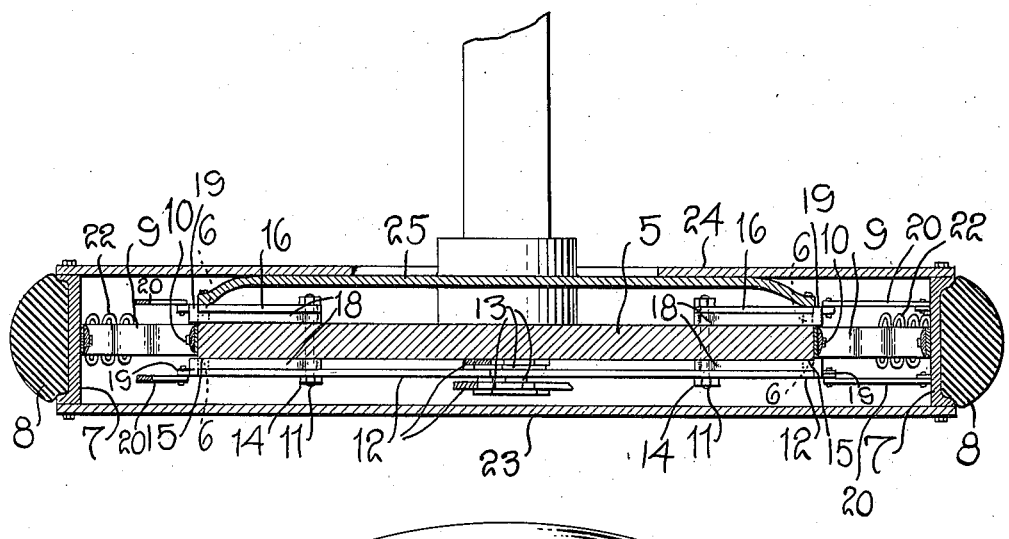
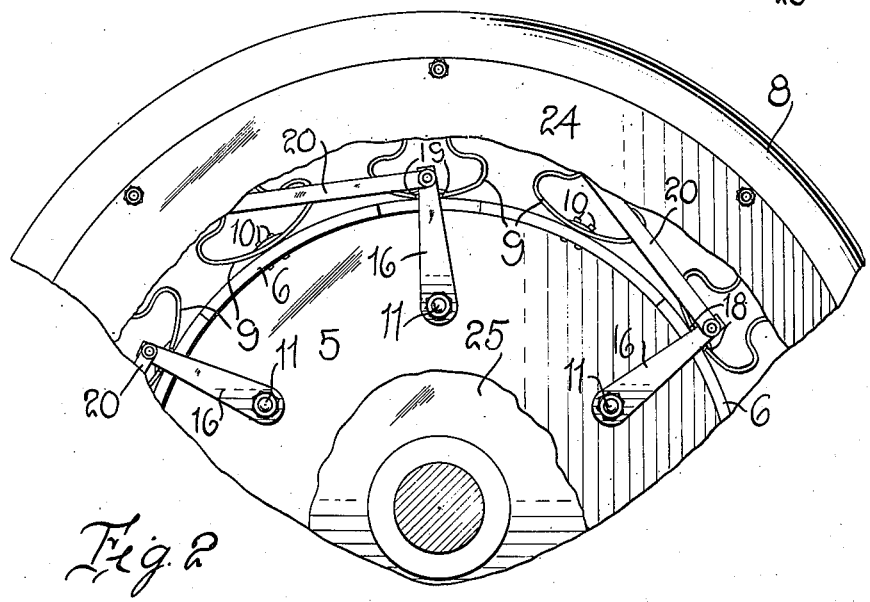
Inventor
CHARLES H. LIKELY
By Watson E. Coleman
Attorney

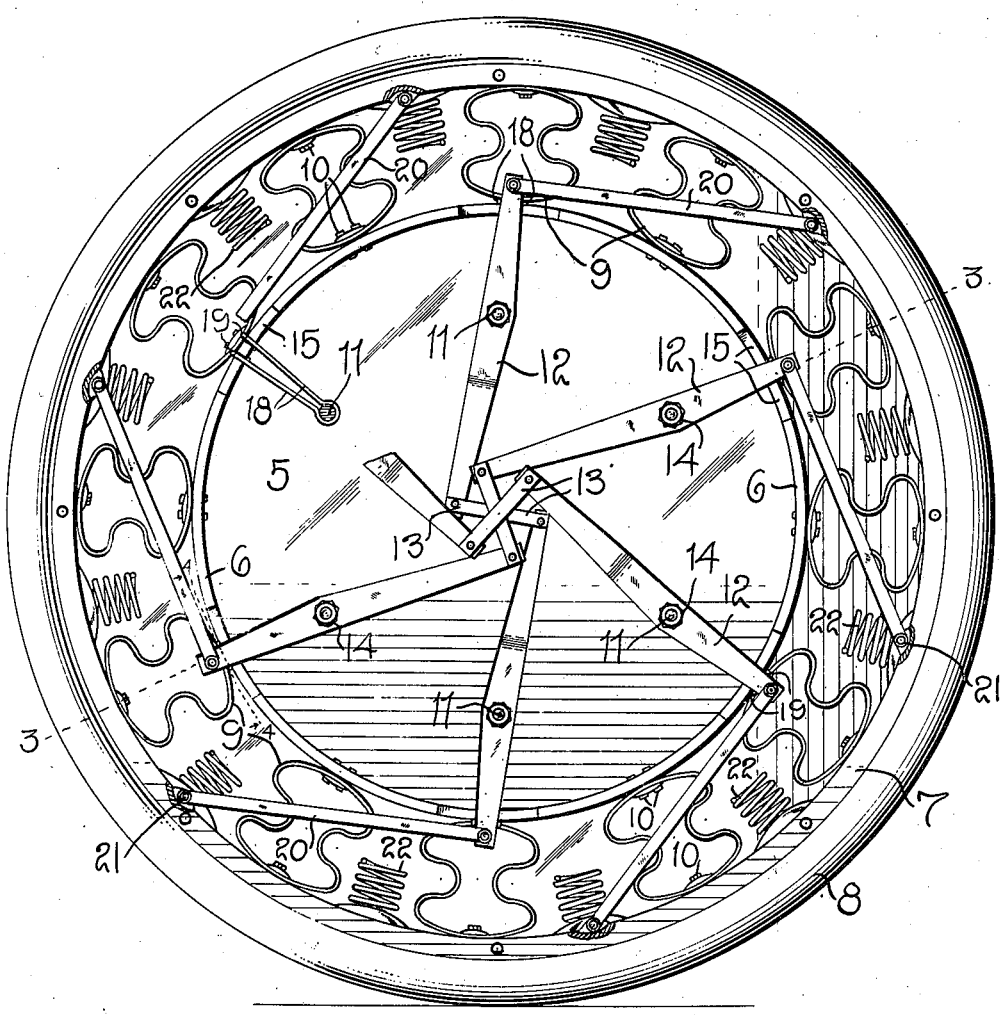
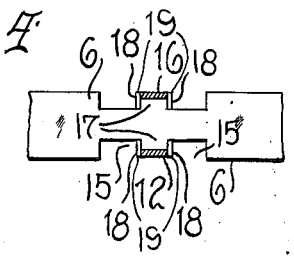

UNITED STATES PATENT OFFICE.

CHARLES H. LIKELY, OF WOODY, CALIFORNIA.

SPRING-WHEEL.

1,166,697. Specification of Letters Patent. Patented Jan. 4, 1916.

Application filed October 27, 1915. Serial No. 58,184.

*To all whom it may concern:*

Be it known that I, CHARLES H. LIKELY, a citizen of the United States, residing at Woody, in the county of Kern and State of California, have invented certain new and useful Improvements in Spring-Wheels, of which the following is a specification, reference being had to the accompanying drawings.

This invention relates to an improved spring wheel and has for its primary object to provide a wheel of this character primarily designed for use upon motor vehicles wherein the usual pneumatic tire is dispensed with while, at the same time, all shocks or jars are absorbed in the wheel structure.

The invention has for a more particular object to provide a wheel of the above type embodying a web having a rim upon its periphery, an outer rim and cushioning means arranged between the two rims, diametrically opposed power transmission equalizing levers mounted upon the web, and connections between said levers and the outer wheel rim.

The invention has for an additional object to provide improved means for yieldingly holding the levers against pivotal movement which also acts as additional cushioning means for the outer wheel rim.

With the above and other objects in view, my invention consists in the novel features of construction, combination and arrangement of parts to be hereinafter more fully described, claimed and illustrated in the accompanying drawings, in which, Figure 1 is a side elevation of my improved wheel with the outer face or cover plate removed; Fig. 2 is a fragmentary elevation of the opposite side of the wheel; Fig. 3 is a section taken on the line 3—3 of Fig. 1; Fig. 4 is a detail horizontal section taken on the line 4—4 of Fig. 1; and Fig. 5 is a similar view showing the equalizing levers moved from their normal position against the action of the holding springs.

Referring in detail to the drawings, 5 designates the body of the wheel which, as illustrated, is preferably in the form of a solid metal web having laterally projecting flanges 6 extending from opposite sides thereof at its periphery. These flanges constitute the inner wheel rim and an outer rim 7 is arranged normally in spaced concentric relation thereto. This outer rim may be suitably formed to receive a solid rubber tread, indicated at 8. Convolute cushioning springs 9 are arranged in equidistant spaced relation between the inner and outer rims 6 and 7 of the wheel and are securely bolted to said rims, as shown at 10.

A plurality of transversely disposed rods or bolts 11 are fixed in the web or body 5 of the wheel and project laterally from the opposite faces thereof. Upon one end of each of the bolts 11, an equalizing lever 12 is fulcrumed intermediate of its ends. These levers extend inwardly to the center of the wheel and the diametrically opposed levers are connected at their inner ends by links 13. The extremities of the rods 11 are reduced and threaded to receive the nuts 14, whereby the equalizing levers are retained in place thereon. The outer ends of the levers 12 are movable through recesses 15 formed in the flanges 6 upon the wheel web 5. Upon the other ends of the bolts 11, relatively short outwardly projecting levers 16 are loosely engaged at one of their ends and have their other ends disposed through recesses in the other flange 6. A lug 17 is centrally formed upon the base wall of each of the recesses 15. Upon the opposite ends of each bolt or rod 11, springs 18 are engaged, each of said springs being provided with a loop or bend in its medial portion engaged upon the rod or bolt. The arms of the springs 18 project outwardly through the respective recesses 15 on opposite sides of the lugs 17 and have their extremities angularly bent, as at 19, for engagement against the opposite edges of the levers 12 and 16 respectively. These springs normally act to yieldingly hold the levers in a central position within the recesses 15. The angular terminals 19 of the arms of the springs 18 also engage against the opposite ends of the lugs 17. The levers 12 and 16 also project outwardly beyond the flanges 6 on the wheel body and, to the same, the rods or bars 20 are pivotally connected at one of their ends, the other ends of these bars being suitably pivoted, as at 21, upon the inner face of the outer wheel rim 7.

Between the cushioning springs 9, a second series of auxiliary coil springs 22 are arranged and are fixed at one of their ends to the outer rim 7, the other or inner ends of said springs being normally spaced from the inner wheel rim. These springs are provided for the purpose of further cushioning the inner wheel body when an extra heavy load is being borne by the vehicle.

It will be understood that the wheel body 5 may be provided with a central roller bearing mounted upon the wheel axle or any other approved mounting may be provided for the wheel. The outer side of the wheel upon which the equalizing levers 12 are arranged, is covered by means of a face plate 23 which is suitably secured at its outer edges to the rim 12 of the wheel. A similar plate 24 also covers the opposite or inner face of the wheel. This plate is centrally provided with large openings so that it may freely move with respect to the wheel axle. In order, however, to prevent the entrance of dust and dirt to the interior of the wheel, I provide the protecting plate 25 which is secured at its outer edge to the inner edge of the rim or flange 6 of the wheel body and fits sufficiently close around the axle to prevent the entrance of dust or dirt to the interior of the wheel, but yet freely rotates upon the axle.

From the foregoing description, taken in connection with the accompanying drawings, it is believed that the construction, manner of operation and several advantages of my invention will be clearly and fully understood. When the vehicle passes into ruts or over obstructions in the road surface or is otherwise subjected to vertical shock or jar, said shock will be taken up and absorbed by the springs 9 and 22 between the inner and outer wheel rims. The power is transmitted from the web or body of the wheel to the outer wheel rim by means of the levers 12 and 16 equally at diametrically opposite points, and these levers operate to relieve the cushioning springs of all twisting or torsional strains which would otherwise devolve thereon and result in the distortion or breakage of the springs. In the movement of the levers 12 and 16 from their normal positions, they bear against one or the other of the arms of the springs 18 and force the same laterally in the recess 16 of the inner wheel rim away from the lug 17 on said rim, as clearly shown in Fig. 5 of the drawings, while the other arm of the spring will remain in contact with said lug. Thus, this spring acts as an additional cushioning means, as well as to return the equalizing levers to their normal positions as the wheel continues to rotate. In this manner, it will be apparent that all shocks or jars are completely absorbed in the wheel structure and will not be transmitted to the body of the vehicle. It is apparent, of course, that the invention may be utilized in connection with a wheel having the usual spokes instead of a solid web, as above referred to. The form and arrangement of the cushioning springs between the inner and outer spokes is also susceptible of considerable variation. I further reserve the privilege of adopting all such legitimate modifications in the form, proportion and arrangement of the several elements employed as may be fairly embodied within the spirit and scope of the invention as claimed.

Having thus fully described my invention, what I desire to claim and secure by Letters Patent is:—

1. A spring wheel including inner and outer rims and cushioning means interposed therebetween, radially disposed diametrically opposed power transmission equalizing levers arranged upon one side of the wheel, links connecting the inner ends of the opposed levers, an additional series of radially disposed pivotally mounted levers on the opposite side of the wheel body, and means connecting the outer ends of the two series of levers to the outer wheel rim.

2. A spring wheel including inner and outer rims and cushioning means interposed therebetween, radially disposed diametrically opposed power transmission equalizing levers arranged upon one side of the wheel, links connecting the inner ends of the opposed levers, an additional series of radially disposed pivotally mounted levers on the opposite side of the wheel body, means connecting the outer ends of the two series of levers to the outer wheel rim, and means acting to yieldingly prevent movement of said levers from their normal positions.

3. A spring wheel including a body having a rim, an outer rim normally disposed in concentric relation to said inner rim, cushioning means arranged between said inner and outer rims, said inner rim being provided with spaced recesses in its opposite edges, a series of equalizing levers fulcrumed intermediate of their ends upon the wheel body and arranged in diametrically opposed relation, links connecting the inner ends of the opposed levers to each other, a second series of levers pivotally mounted upon the opposite side of the wheel body, said levers being movable in the recesses of the inner rim, bars pivotally connected to the outer ends of the levers and to said outer rim, and springs extending into said recesses and bearing against the opposite edges of the levers to yieldingly hold said levers against movement in either direction from a central position in the recesses.

4. A spring wheel including a body provided with a rim projecting from opposite sides thereof, an outer rim arranged normally in concentric relation to the inner rim, spaced cushioning springs fixed to the inner and outer rims, a series of transversely disposed bolts fixed in the wheel body, equalizing levers fulcrumed intermediate of their ends upon said bolts on one side of the wheel body and arranged in diametrically opposed relation, links connecting the inner ends of the opposed levers to each other, a second series of levers pivotally mounted upon said bolts on the opposite side of the wheel body, said inner rim being provided in its opposite edges with spaced recesses to accommodate said levers and having lugs centrally formed upon the base wall of said recesses, bars pivotally connected to the outer ends of said levers and to the outer wheel rim, and springs arranged upon the opposite ends of said bolts, each spring having spaced arms extending into one of the recesses and bearing against the opposite edges of the lever therein and contacting with said lug, said spring arms yieldingly holding the levers against movement in either direction in the recesses from a normal position.

In testimony whereof I hereunto affix my signature in the presence of two witnesses.

CHARLES H. LIKELY.

Witnesses:
C. E. PETTYPOOL,
C. E. TIMMONS.